(12) United States Patent
Hwang

(10) Patent No.: US 7,152,619 B2
(45) Date of Patent: Dec. 26, 2006

(54) AIR TAP ASSEMBLY

(76) Inventor: Mike Hwang, 7019, Abbottswood Dr., Rancho Palos Verdes, CA (US) 90275

( * ) Notice: Subject to any disclaimer, the term of this patent is extended or adjusted under 35 U.S.C. 154(b) by 259 days.

(21) Appl. No.: 10/894,494

(22) Filed: Jul. 20, 2004

(65) Prior Publication Data

US 2006/0016489 A1 Jan. 26, 2006

(51) Int. Cl.
*F16K 15/20* (2006.01)
(52) U.S. Cl. ................ 137/223; 137/599.18; 137/890; 137/895
(58) Field of Classification Search ............... 137/599, 137/18, 223, 890, 895; 251/82
See application file for complete search history.

(56) References Cited

U.S. PATENT DOCUMENTS

| | | | | |
|---|---|---|---|---|
| 2,789,577 A | * | 4/1957 | Hosking | 137/223 |
| 3,260,276 A | * | 7/1966 | Stasiunas | 137/234.5 |
| 3,338,266 A | * | 8/1967 | Zilka et al. | 137/895 |
| 3,368,302 A | * | 2/1968 | Martino | 137/223 |
| 5,159,961 A | * | 11/1992 | Snetting et al. | 137/223 |
| 5,203,831 A | * | 4/1993 | Lind et al. | 137/1 |

* cited by examiner

*Primary Examiner*—Stephen M. Hepperle
(74) *Attorney, Agent, or Firm*—Alan D. Kamrath; Nikolai & Mersereau, P.A.

(57) ABSTRACT

An air tap assembly includes a mounting seat, a connecting member, a stop member, and an end cap. Thus, the stop plate of the stop member prevents the air in the air cushion from leaking outward through the vent holes of the connecting member, so that the air tap assembly has an anti-reverse effect to prevent the air from leaking outward from the air cushion during the inflating process, thereby facilitating a user inflating the air cushion.

20 Claims, 5 Drawing Sheets

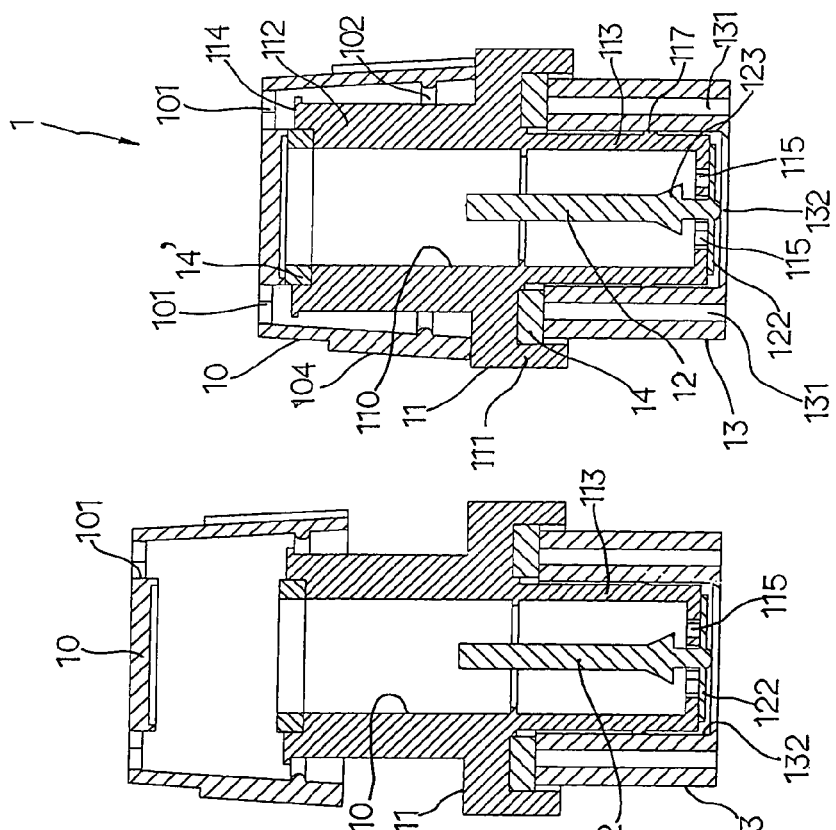
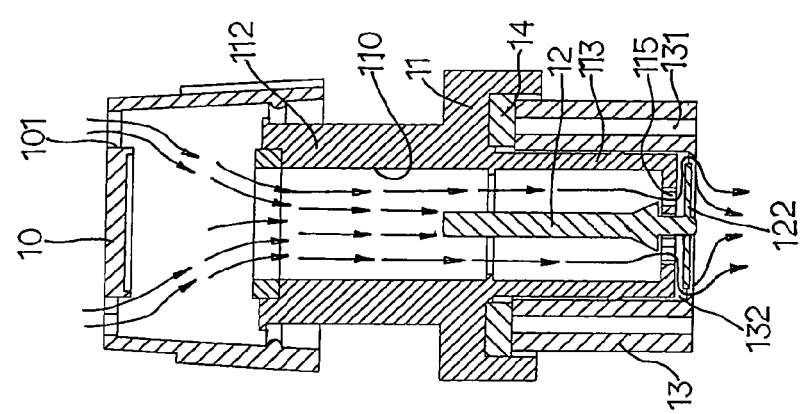
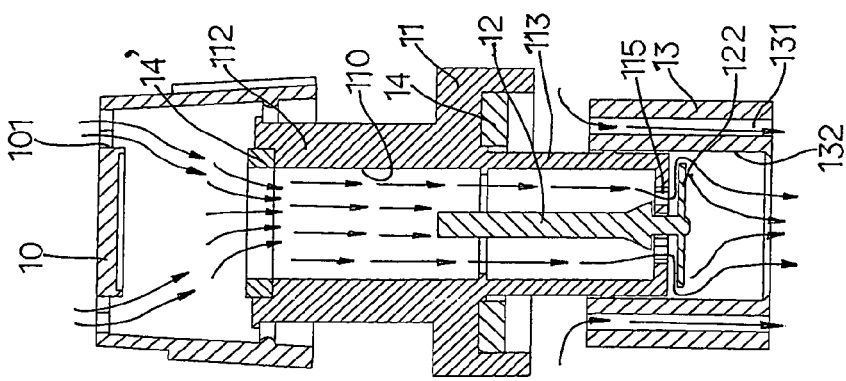

AIR TAP ASSEMBLY

BACKGROUND OF THE INVENTION

1. Field of the Invention

The present invention relates to an air tap assembly, and more particularly to an air tap assembly having an anti-reverse effect.

2. Description of the Related Art

A conventional air tap is mounted on an air cushion (or mattress) to introduce air into the air cushion by an inflator or in a manual manner so as to inflate the air cushion. However, the conventional air tap does not have an anti-reverse effect, so that the air is introduced through the air tap to flow outward from the air cushion freely, thereby greatly causing inconvenience to a user when inflating the air cushion.

SUMMARY OF THE INVENTION

In accordance with the present invention, there is provided an air tap assembly, comprising a mounting seat, a connecting member, a stop member, and an end cap, wherein:

the mounting seat and has an inside formed with a passage and a peripheral wall formed with a plurality of conducting channels;

the connecting member is rotatably mounted on the mounting seat and includes a cylindrical body, a first pivot portion mounted on a first side of the cylindrical body and movably mounted in the passage of the mounting seat, and a second pivot portion mounted on a second side of the cylindrical body;

the connecting member has an inside formed with a guide channel extended through the first pivot portion, the cylindrical body and the second pivot portion;

the first pivot portion of the connecting member has a first end extended from the cylindrical body and a second end having a closed wall formed with a plurality of vent holes each communicating with the guide channel of the connecting member and the passage of the mounting seat;

the stop member is mounted on the connecting member and has a distal end formed with a stop plate protruding outward from the first pivot portion of the connecting member to seal the vent holes of the first pivot portion of the connecting member; and the end cap is rotatably mounted on the connecting member and has a first end rested on the cylindrical body of the connecting member and a second end having a closed wall formed with a plurality of vent holes communicating with the guide channel of the connecting member.

The primary objective of the present invention is to provide an air tap assembly having an anti-reverse effect to prevent air from leaking outward from the air cushion during the inflating process.

Another objective of the present invention is to provide an air tap assembly, wherein the stop plate of the stop member prevents the air in the air cushion from leaking outward through the vent holes of the connecting member, so that the air tap assembly has an anti-reverse effect to prevent the air from leaking outward from the air cushion during the inflating process, thereby facilitating a user inflating the air cushion.

A further objective of the present invention is to provide an air tap assembly, wherein the air is introduced through the vent holes of the end cap, the guide channel of the connecting member, the vent holes of the connecting member and the passage of the mounting seat into the air cushion and is also directly introduced through the conducting channels of the mounting seat into the air cushion, so that the air flows into the air cushion in a larger manner so as to inflate the air cushion rapidly, thereby facilitating the user inflating the air cushion.

Further benefits and advantages of the present invention will become apparent after a careful reading of the detailed description with appropriate reference to the accompanying drawings.

BRIEF DESCRIPTION OF THE DRAWINGS

FIG. 4 is a plan cross-sectional view of the air tap assembly as shown in FIG. 1;

FIG. 5 is a schematic operational view of the air tap assembly as shown in FIG. 4;

FIG. 6 is a schematic operational view of the air tap assembly as shown in FIG. 5;

FIG. 7 is a schematic operational view of the air tap assembly as shown in FIG. 6.

DETAILED DESCRIPTION OF THE INVENTION

Figure 1:
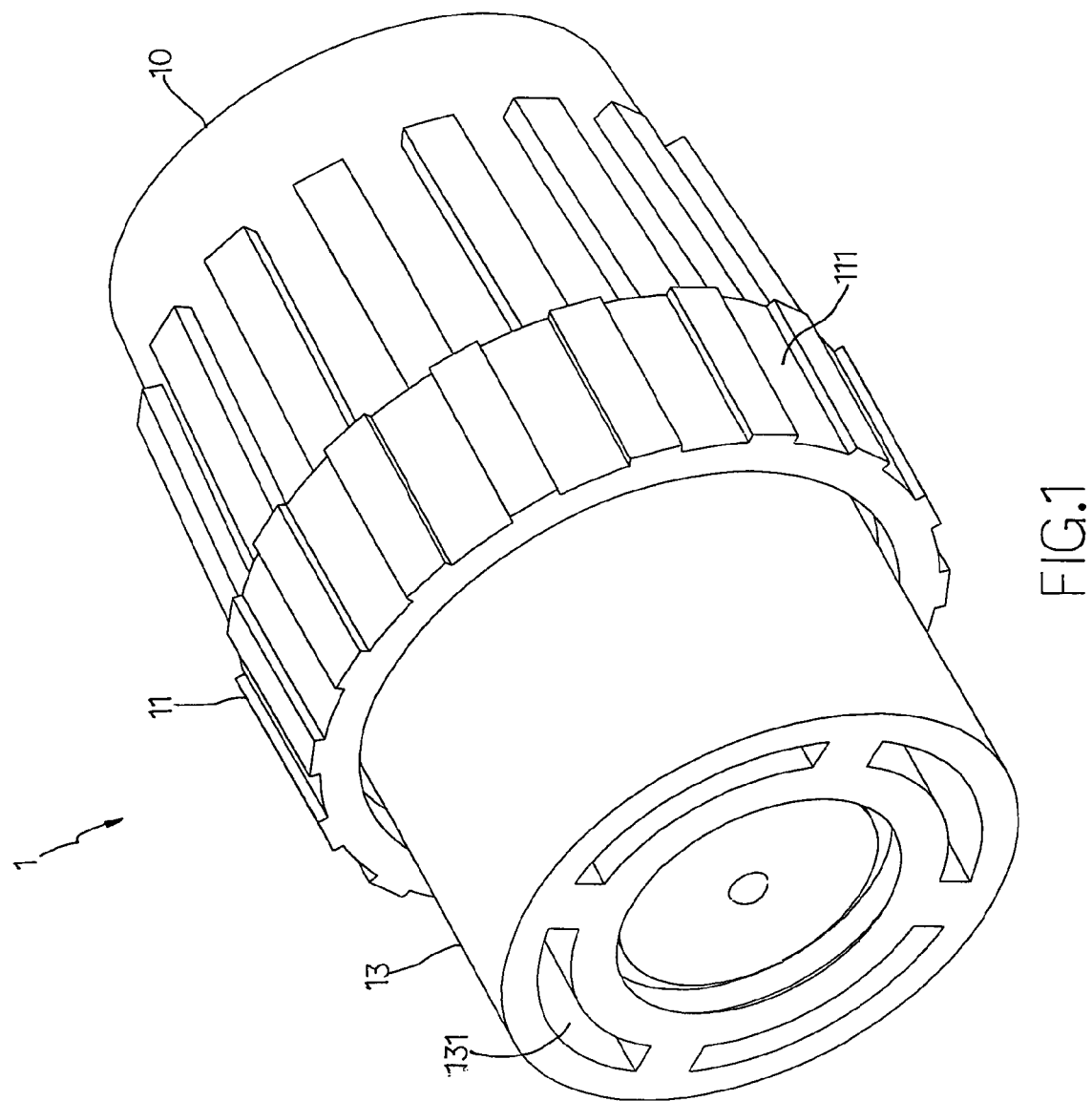
FIG. 1 is a perspective view of an air tap assembly in accordance with the preferred embodiment of the present invention.

Referring to the drawings and initially to FIGS. 1–4, an air tap assembly 1 in accordance with the preferred embodiment of the present invention comprises a mounting seat 13, a connecting member 11, a stop member 12, and an end cap 10.

The mounting seat 13 has a cylindrical shape and has an inside formed with a passage 132 longitudinally extended through the mounting seat 13 and a peripheral wall formed with a plurality of conducting channels 131 each longitudinally extended through the mounting seat 13. The passage 132 of the mounting seat 13 has a first end formed with an annular stop flange 133 radially extended inward therefrom and a second end formed with an inner thread 134. Each of the conducting channels 131 of the mounting seat 13 has an arc-shaped cross-section.

The connecting member 11 is rotatably mounted on the mounting seat 13 and includes a cylindrical body 111, a first pivot portion 113 mounted on a first side of the cylindrical body 111 and movably mounted in the passage 132 of the mounting seat 13, and a second pivot portion 112 mounted on a second side of the cylindrical body 111. The connecting member 11 has an inside formed with a guide channel 110 extended through the first pivot portion 113, the cylindrical body 111 and the second pivot portion 112.

The cylindrical body 111 of the connecting member 11 has an inside formed with a receiving recess 119 and has a periphery formed with a plurality of anti-skid ribs 1111.

A washer 14 is mounted on the cylindrical body 111 of the connecting member 11 to move therewith and rested on the mounting seat 13 to seal the conducting channels 131 of the mounting seat 13. Preferably, the washer 14 is received in the receiving recess 119 of the cylindrical body 111 of the connecting member 11.

The first pivot portion 113 of the connecting member 11 has a first end extended from the cylindrical body 111 and a second end formed with an outer thread 118 screwed into the inner thread 134 of the mounting seat 13. The first pivot portion 113 of the connecting member 11 has a mediate portion formed with an annular limit rib 117 that is movable to abut the stop flange 133 of the mounting seat 13 to prevent the first pivot portion 113 of the connecting member 11 from being moved outward excessively relative to the mounting seat 13. The second end of the first pivot portion 113 of the connecting member 11 has a closed wall formed with a plurality of vent holes 115 each communicating with the guide channel 110 of the connecting member 11 and the passage 132 of the mounting seat 13. The closed wall of the first pivot portion 113 of the connecting member 11 is formed with a mounting hole 1150 communicating with the guide channel 110 of the connecting member 11.

The second pivot portion 112 of the connecting member 11 has a first end extended from the cylindrical body 111 and formed with an outer thread 116 and a second end having a periphery formed with an annular stop edge 114 radially extended outward therefrom. The second end of the second pivot portion 112 of the connecting member 11 has an inside formed with a receiving groove 119' for mounting a secondary washer 14'.

The stop member 12 is mounted on the connecting member 11 and has a distal end formed with a circular stop plate 122 protruding outward from the first pivot portion 113 of the connecting member 11 to seal the vent holes 115 of the first pivot portion 113 of the connecting member 11. The stop member 12 is movably mounted in the mounting hole 1150 of the first pivot portion 113 of the connecting member 11 and has a mediate portion formed with a flexible wedge-shaped stop rib 123 located in the guide channel 110 of the connecting member 11 and movable to abut the closed wall of the first pivot portion 113 of the connecting member 11. Preferably, the stop rib 123 of the stop member 12 is forced into the mounting hole 1150 of the first pivot portion 113 of the connecting member 11 by its flexibility.

The end cap 10 is rotatably mounted on the connecting member 11 and is movably mounted on the second pivot portion 112 of the connecting member 11. The end cap 10 has a first end rested on the cylindrical body 111 of the connecting member 11 and a second end having a closed wall formed with a plurality of vent holes 101 communicating with the guide channel 110 of the connecting member 11. The closed wall of the end cap 10 is rested on the secondary washer 14' to interrupt a connection between the vent holes 101 of the end cap 10 and the guide channel 110 of the connecting member 11. The first end of the end cap 10 is formed with an inner thread 103 screwed onto the outer thread 116 of the second pivot portion 112 of the connecting member 11. The first end of the end cap 10 is formed with an annular limit rib 102 that is movable to abut the stop edge 114 of the second pivot portion 112 of the connecting member 11 to prevent the end cap 10 from being moved outward excessively relative to the second pivot portion 112 of the connecting member 11. The end cap 10 has a periphery formed with a plurality of anti-skid ribs 104.

Figure 2:
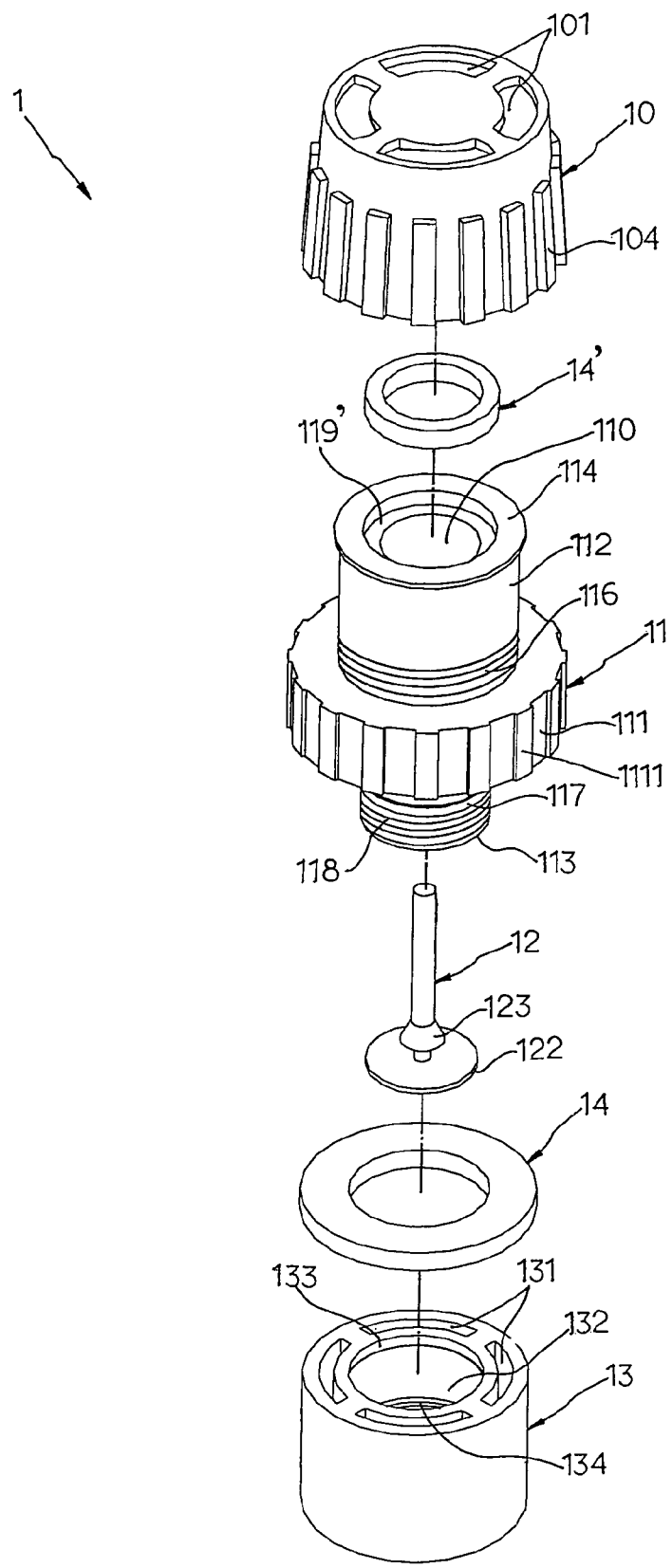
FIG. 2 is an exploded perspective view of the air tap assembly as shown in FIG. 1.
Figure 3:
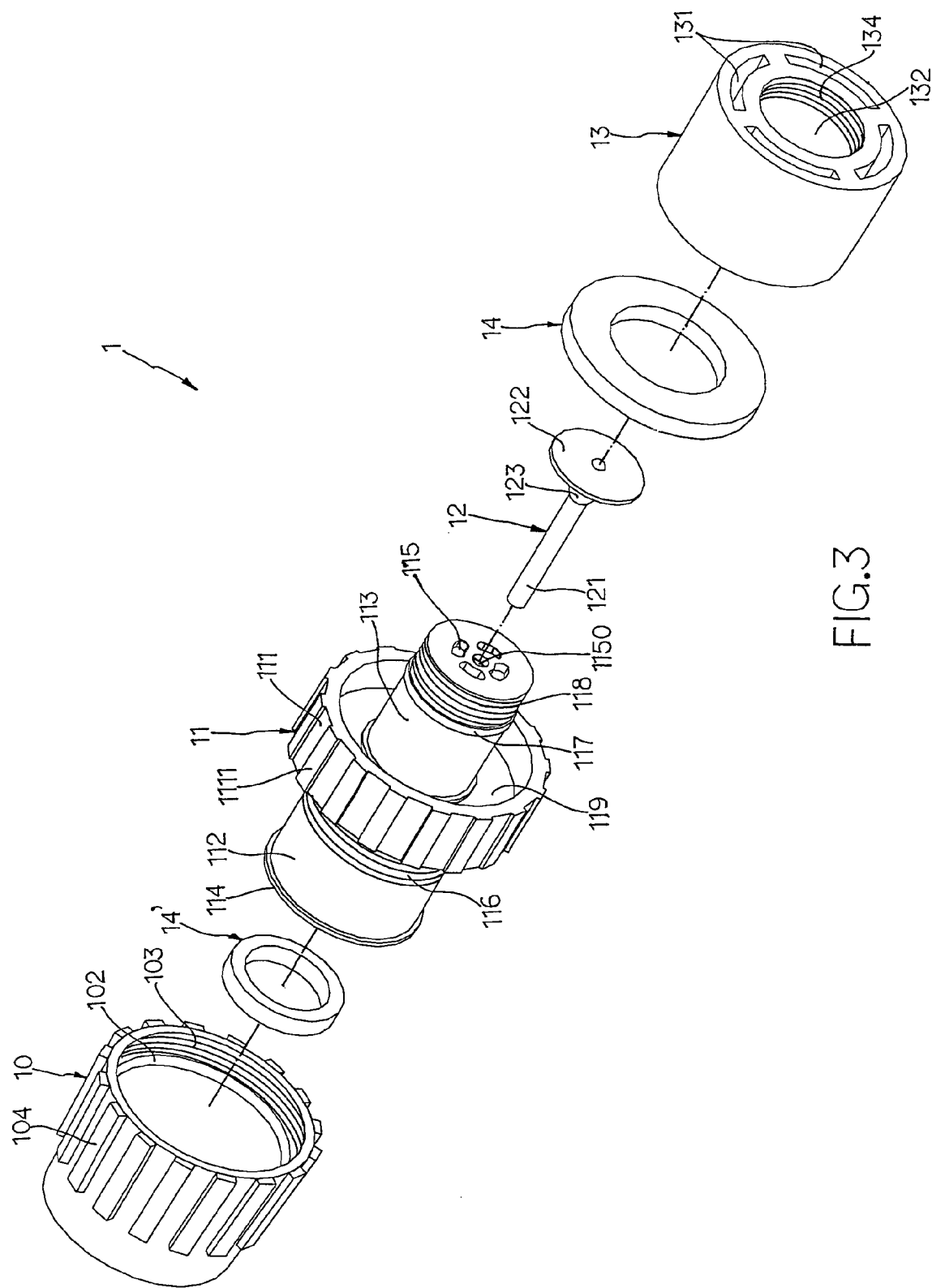
FIG. 3 is an exploded perspective view of the air tap assembly as shown in FIG. 1.
Figure 8:
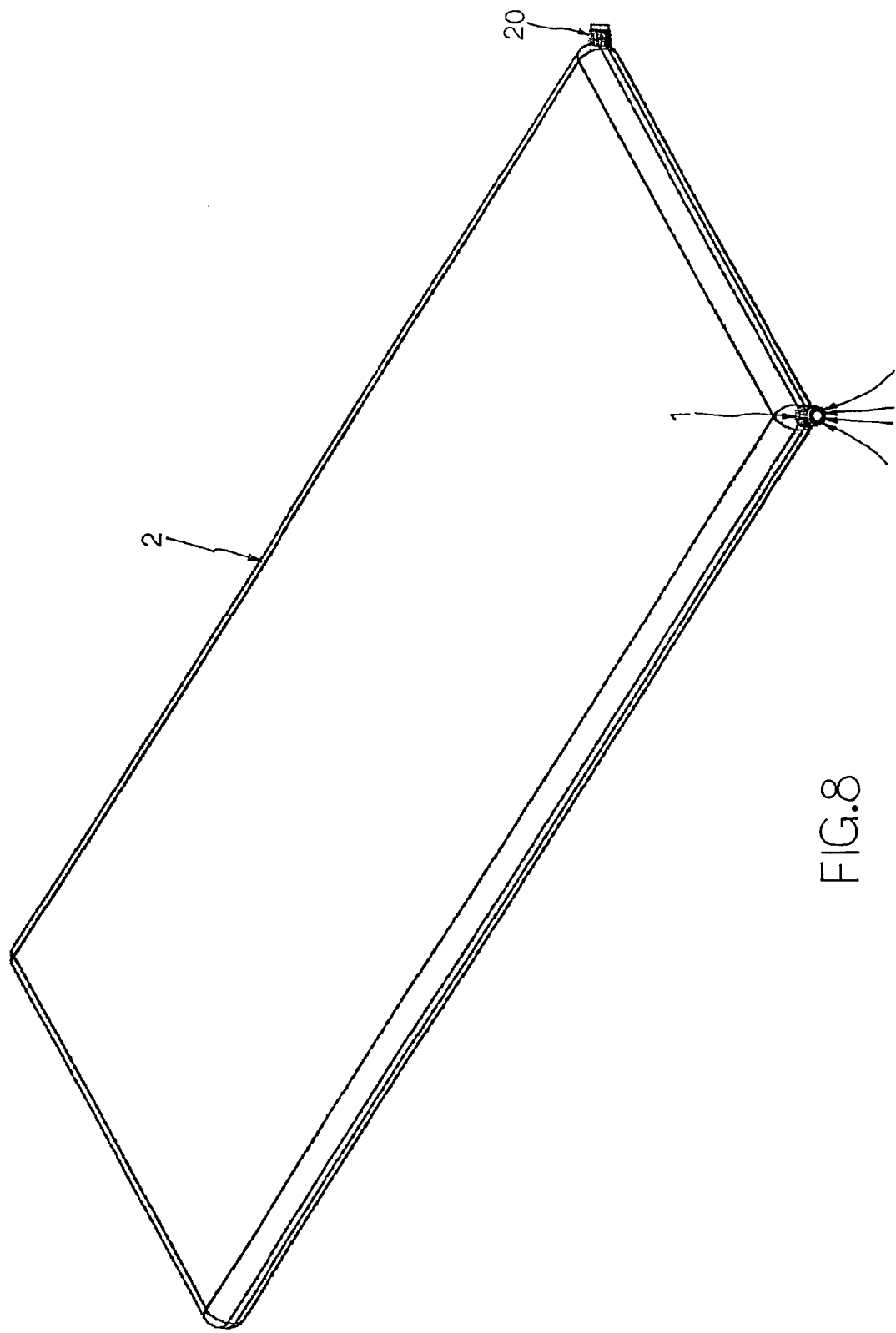
FIG. 8 is a perspective view showing use of the air tap assembly in accordance with the preferred embodiment of the present invention.

In operation, referring to FIGS. 4–8 with reference to FIGS. 1–3, the air tap assembly 1 is mounted on an air cushion (or mattress) 2, with the mounting seat 13 being mounted to a corner of the air cushion 2 as shown in FIG. 8 to introduce air into the air cushion 2 so as to inflate the air cushion 2. In addition, an air valve 20 is mounted to the other corner of the air cushion 2 to introduce the air outward from the air cushion 2 so as to deflate the air cushion 2. At this time, the connecting member 11 is screwed on the mounting seat 13, and the end cap 10 is screwed on the connecting member 11 as shown in FIG. 4, so that the air contained in the air cushion 2 will not leak from the air tap assembly 1.

When a user wishes to inflate the air cushion 2, the end cap 10 is unscrewed from the connecting member 11 as shown in FIG. 5 to detach the secondary washer 14' from the end cap 10, so that each of the vent holes 101 of the end cap 10 communicates with the guide channel 110 of the connecting member 11.

In such a manner, the air of the ambient environment is introduced through the vent holes 101 of the end cap 10 into the guide channel 110 of the connecting member 11 by an inflator or in a manual manner to push the stop plate 122 of the stop member 12 to move outward relative to the first pivot portion 113 of the connecting member 11, thereby detaching the stop plate 122 of the stop member 12 from the vent holes 115 of the first pivot portion 113 of the connecting member 11, so that the air of the ambient environment in turn flows through the vent holes 101 of the end cap 10, the guide channel 110 of the connecting member 11, the vent holes 115 of the first pivot portion 113 of the connecting member 11 and the passage 132 of the mounting seat 13 into the air cushion 2 as shown in FIG. 5.

At the same time, the connecting member 11 is unscrewed from the mounting seat 13 as shown in FIG. 5, so that the washer 14 is detached form the conducting channels 131 of the mounting seat 13 to connect the conducting channels 131 of the mounting seat 13 to the ambient environment. In such a manner, the air of the ambient environment is directly introduced through the conducting channels 131 of the mounting seat 13 into the air cushion 2 as shown in FIG. 5.

Thus, the air of the ambient environment is in turn introduced through the vent holes 101 of the end cap 10, the guide channel 110 of the connecting member 11, the vent holes 115 of the first pivot portion 113 of the connecting member 11 and the passage 132 of the mounting seat 13 into the air cushion 2 and is directly introduced through the conducting channels 131 of the mounting seat 13 into the air cushion 2, so that the air of the ambient environment flows into the air cushion 2 in a larger manner so as to inflate the air cushion 2 rapidly.

Alternatively, the connecting member 11 is screwed on the mounting seat 13, and the end cap 10 is unscrewed from the connecting member 11 as shown in FIG. 6, so that the conducting channels 131 of the mounting seat 13 is sealed by the washer 14. Thus, the air of the ambient environment is in turn introduced through the vent holes 101 of the end cap 10, the guide channel 110 of the connecting member 11, the vent holes 115 of the first pivot portion 113 of the connecting member 11 and the passage 132 of the mounting seat 13 into the air cushion 2 as shown in FIG. 6, so that the air of the ambient environment flows into the air cushion 2 in a smaller manner.

As shown in FIG. 7, after the air cushion 2 is inflated completely, the stop plate 122 of the stop member 12 is pushed by the pressure in the air cushion 2 to return to the original position to seal the vent holes 115 of the first pivot portion 113 of the connecting member 11, so that the air contained in the air cushion 2 will not leak from the air tap assembly 1.

Accordingly, the stop plate 122 of the stop member 12 prevents the air contained in the air cushion 2 from leaking outward through the vent holes 115 of the first pivot portion 113 of the connecting member 11, so that the air tap assembly 1 has an anti-reverse effect to prevent the air from leaking outward from the air cushion 2 during the inflating process, thereby facilitating a user inflating the air cushion 2. In addition, the air is introduced through the vent holes 101 of the end cap 10, the guide channel 110 of the connecting member 11, the vent holes 115 of the first pivot portion 113 of the connecting member 11 and the passage 132 of the mounting seat 13 into the air cushion 2 and is also directly introduced through the conducting channels 131 of the mounting seat 13 into the air cushion 2, so that the air flows into the air cushion 2 in a larger manner so as to inflate the air cushion 2 rapidly, thereby facilitating the user inflating the air cushion 2.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An air tap assembly, comprising a mounting seat, a connecting member, a stop member, and an end cap, wherein:
   the mounting seat has an inside formed with a passage and a peripheral wall formed with a plurality of conducting channels;
   the connecting member is rotatably mounted on the mounting seat and includes a cylindrical body, a first pivot portion mounted on a first side of the cylindrical body and movably mounted in the passage of the mounting seat, and a second pivot portion mounted on a second side of the cylindrical body;
   the connecting member has an inside formed with a guide channel extended through the first pivot portion, the cylindrical body and the second pivot portion;
   the first pivot portion of the connecting member has a first end extended from the cylindrical body and a second end having a closed wall formed with a plurality of vent holes each communicating with the guide channel of the connecting member and the passage of the mounting seat;
   the stop member is mounted on the connecting member and has a distal end formed with a stop plate protruding outward from the first pivot portion of the connecting member to seal the vent holes of the first pivot portion of the connecting member; and
   the end cap is rotatably mounted on the connecting member and has a first end rested on the cylindrical body of the connecting member and a second end having a closed wall formed with a plurality of vent holes communicating with the guide channel of the connecting member.

2. The air tap assembly in accordance with claim 1, wherein the passage of the mounting seat has a first end formed with an annular stop flange radially extended inward therefrom, and the first pivot portion of the connecting member has a mediate portion formed with an annular limit rib that is movable to abut the stop flange of the mounting seat to prevent the first pivot portion of the connecting member from being moved outward excessively relative to the mounting seat.

3. The air tap assembly in accordance with claim 1, wherein the passage of the mounting seat has a second end formed with an inner thread, and the second end of the first pivot portion of the connecting member is formed with an outer thread screwed into the inner thread of the mounting seat.

4. The air tap assembly in accordance with claim 1, wherein the cylindrical body of the connecting member has a periphery formed with a plurality of anti-skid ribs.

5. The air tap assembly in accordance with claim 1, further comprising a washer mounted on the cylindrical body of the connecting member to move therewith and rested on the mounting seat to seal the conducting channels of the mounting seat.

6. The air tap assembly in accordance with claim 5, wherein the cylindrical body of the connecting member has an inside formed with a receiving recess, and the washer is received in the receiving recess of the cylindrical body of the connecting member.

7. The air tap assembly in accordance with claim 1, wherein the closed wall of the first pivot portion of the connecting member is formed with a mounting hole communicating with the guide channel of the connecting member, and the stop member is movably mounted in the mounting hole of the first pivot portion of the connecting member.

8. The air tap assembly in accordance with claim 1, wherein the second pivot portion of the connecting member has a first end extended from the cylindrical body and formed with an outer thread, and the first end of the end cap is formed with an inner thread screwed onto the outer thread of the second pivot portion of the connecting member.

9. The air tap assembly in accordance with claim 1, wherein the second pivot portion of the connecting member has a second end having a periphery formed with an annular stop edge radially extended outward therefrom, and the first end of the end cap is formed with an annular limit rib that is movable to abut the stop edge of the second pivot portion of the connecting member to prevent the end cap from being moved outward excessively relative to the second pivot portion of the connecting member.

10. The air tap assembly in accordance with claim 9, wherein the second end of the second pivot portion of the connecting member has an inside formed with a receiving groove for mounting a secondary washer.

11. The air tap assembly in accordance with claim 10, wherein the closed wall of the end cap is rested on the secondary washer to interrupt a connection between the vent holes of the end cap and the guide channel of the connecting member.

12. The air tap assembly in accordance with claim 1, wherein the stop member has a mediate portion formed with a flexible stop rib located in the guide channel of the connecting member and movable to abut the closed wall of the first pivot portion of the connecting member.

13. The air tap assembly in accordance with claim 12, wherein the stop rib of the stop member is wedge-shaped.

14. The air tap assembly in accordance with claim 1, wherein the end cap is movably mounted on the second pivot portion of the connecting member.

15. The air tap assembly in accordance with claim 1, wherein the end cap 10 has a periphery formed with a plurality of anti-skid ribs.

16. The air tap assembly in accordance with claim 1, wherein the mounting seat has a cylindrical shape.

17. The air tap assembly in accordance with claim 1, wherein the passage is longitudinally extended through the mounting seat.

18. The air tap assembly in accordance with claim 1, wherein each of the conducting channels of the mounting seat is longitudinally extended through the mounting seat.

19. The air tap assembly in accordance with claim 1, wherein each of the conducting channels of the mounting seat has an arc-shaped cross-section.

20. The air tap assembly in accordance with claim 1, wherein the stop plate of the stop member is circular.

* * * * *